Figure 1:
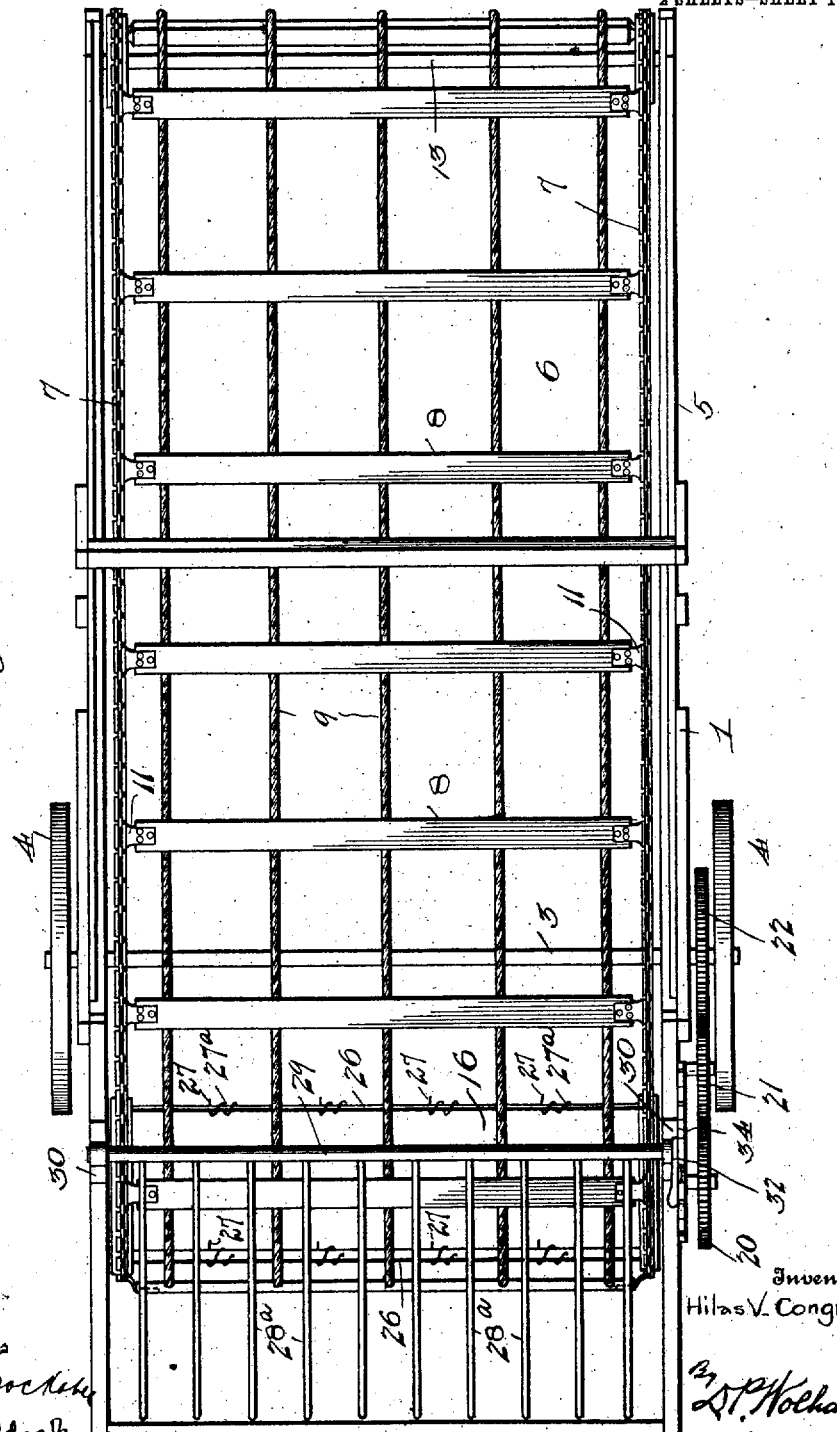

No. 850,138. PATENTED APR. 16, 1907.
H. V. CONGROVE.
HAY LOADER.
APPLICATION FILED APR. 13, 1906.

2 SHEETS—SHEET 1.

Witnesses
T. L. Mockett
R. C. Braddock.

Inventor
Hilas V. Congrove.

Attorney

No. 850,138. PATENTED APR. 16, 1907.
H. V. CONGROVE.
HAY LOADER.
APPLICATION FILED APR. 13, 1906.
2 SHEETS—SHEET 2.
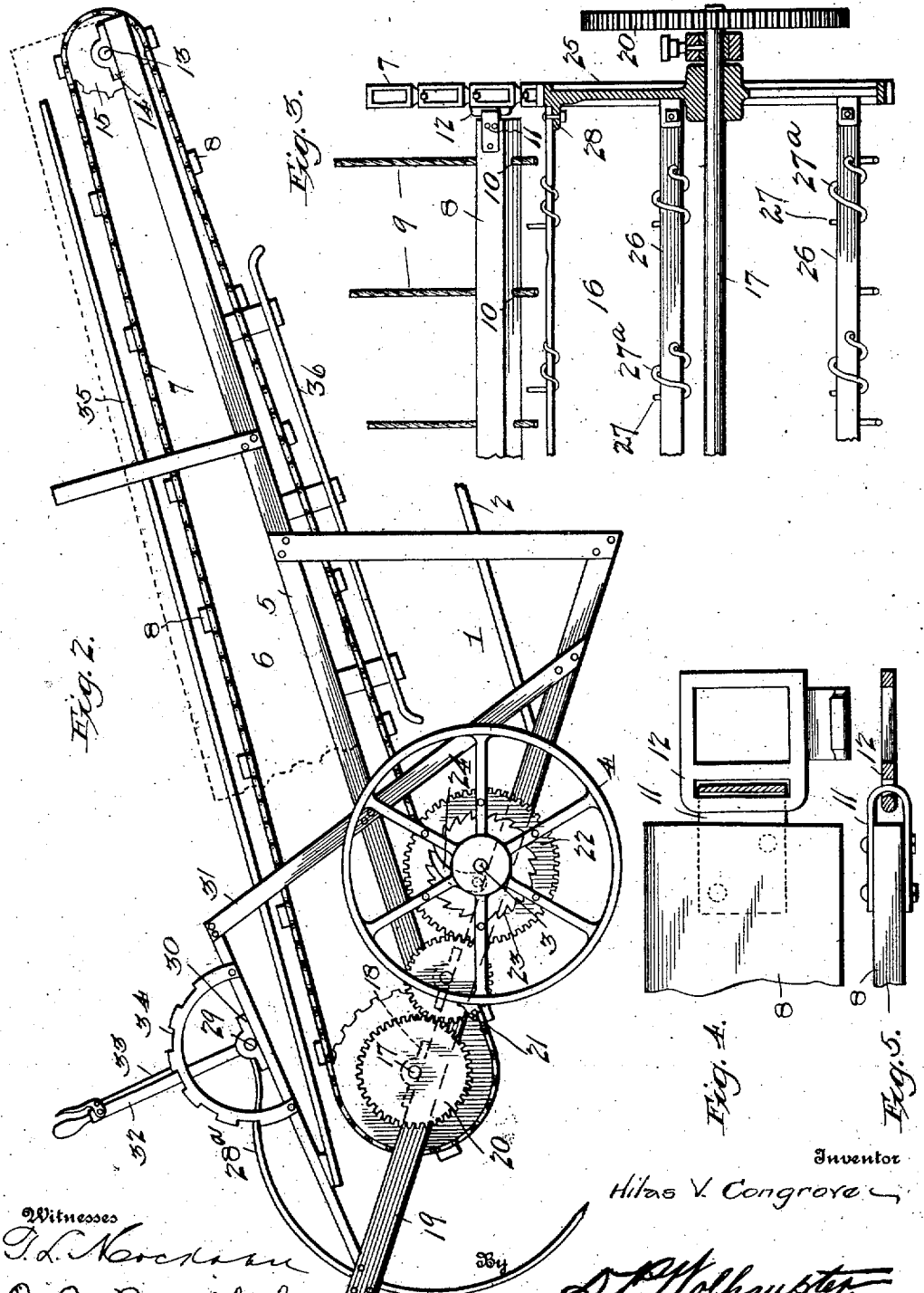
Inventor
Hilas V. Congrove
Witnesses
Attorney

UNITED STATES PATENT OFFICE.

HILAS V. CONGROVE, OF BENDENA, KANSAS, ASSIGNOR OF ONE-HALF TO HOWARD SCHWAB, OF BENDENA, KANSAS.

HAY-LOADER.

No. 850,138.　　　Specification of Letters Patent.　　　Patented April 16, 1907.

Application filed April 13, 1906. Serial No. 311,409.

*To all whom it may concern:*

Be it known that I, HILAS V. CONGROVE, a citizen of the United States, residing at Bendena, in the county of Doniphan and State of Kansas, have invented certain new and useful Improvements in Hay-Loaders, of which the following is a specification.

This invention relates to hay-loading apparatus, and has in view certain novel and thoroughly practical improvements in machines of this character whereby the hay will be thoroughly raked and automatically gathered from the ground and delivered by elevation to the wagon.

To this end the invention contemplates a practical construction of gatherer associated with a lifting-rake and an elevating-conveyer, which positively insures the collection of the hay and the steady and uniform elevation and distribution thereof to the wagon, thereby obviating the objections to many types of hay-loaders which easily become clogged and practically inoperative in cases where the hay is unusually heavy or damp or any obstacle or foreign substance, such as unyielding weeds or brush, may get entangled with the hay.

A further object of the invention is to provide an improved construction of gatherer revolving at a higher rate of speed than the drive-wheels of the machine, thus insuring a gathering power to readily take care of all of the hay fed thereto from the lifting-rake.

With these and many other objects in view, which will more readily appear as the nature of the invention is better understood, the same consists in the novel construction, combination, and arrangement of parts hereinafter more fully described, illustrated, and claimed.

The essential features of the invention involved in carrying out the objects above indicated are susceptible to structural change without departing from the scope of the invention; but a preferred embodiment thereof is shown in the accompanying drawings, in which—

Figure 1 is a top plan view of a hay-loader constructed in accordance with the present invention. Fig. 2 is a side elevation thereof. Fig. 3 is an enlarged plan view, partly in section, of a portion of the gatherer-drum and the elevating-conveyer associated therewith. Figs. 4 and 5 are detailed elements showing the coupling connection of the carrier-slats with the conveyer-chains.

Like references designate corresponding parts in the several figures of the drawings.

The hay-loading machine covered by the present invention includes in its general organization a main carrying-frame (designated in its entirety by the numeral 1) and having extended therefrom a tongue or pole 2 for connection with a hay-wagon in the ordinary manner, thus providing means whereby the machine may be carried over the ground with the wagon and at the same time automatically gather and elevate the hay in a thorough and expeditious manner.

The main carrying-frame 1 is mounted on the transverse supporting-axle 3, carrying upon the opposite ends thereof the ground-wheels 4, which also subserve the function of drive-wheels for the gathering and conveying mechanism to be presently referred to.

The wheel-carrying frame 1 supports and carries all of the working parts of the machine, and the upper or superstructure of the said main frame carries an inclined skeleton elevator-frame 5, within and over which is arranged to work an inclined endless lifting-conveyer 6, onto which is fed and delivered the gathered hay and which is so arranged within and about the elevator-frame 5 as to provide for elevating the hay and dropping the same into the wagon arranged beneath the upper or higher end portion of the said conveyer 6.

To insure thoroughly-satisfactory results, the endless lifting-conveyer is of special construction. As plainly shown in Figs. 1 and 3 of the drawings, the same consists of a pair of oppositely-arranged parallel endless conveyer chains or belts 7, preferably of the sprocket-chain type, a plurality of parallel transversely-arranged carrier-slats 8, connecting the opposite chains or belts 7, and a plurality of longitudinal endless web-forming cables or ropes 9, extending longitudinally the full extent of the conveyer and arranged in spaced parallel relation to form the web-supporting portion thereof. The said endless web-forming cables 9 are arranged to extend through receiving-openings 10 in the slats 8, and the latter have fitted to the opposite ends thereof the looped coupling-straps 11, loosely engaging in hanger-eyes 12, provided at one side of certain of the links of the chains or belts 7.

The upper or higher end portion of the elevating-conveyer 6 is arranged to pass over the upper transverse conveyer-shaft 13, journaled in bearings 14, arranged at the extreme upper end of the frame 5 and carrying oppositely-located upper sprocket-wheels 15, over which pass the chains 7 of the conveyer. At the correspondingly opposite lower end of the inclined elevator-frame 5 the conveyer 6 is arranged to pass directly over a gatherer-drum 16, carried by a drum-supporting shaft 17, journaled in suitable bearings 18, provided on extension-bars 19 of the carrying-frame 1 at the lower end of the elevator-frame. The drum 16 derives its motion (faster than that of the ground-wheels 4) through the medium of driving-gears 20 on the ends of the drum-supporting shaft 17, meshing with intermediate idler-pinions 21, interposed between the said driving-gears 20 and the driving-gears 22, secured to and carried by the ground or drive wheels 4 of the machine. Said driving-gears 22 are preferably provided with internal ratchets 23, engaged by a ratchet-dog 24, mounted on each of the wheels 4 and serving to couple the latter to the gears 22 when the machine is moving in a forward direction. This ratchet-coupling, however, permits the machine to freely back without operating the gatherer-drum and also permits the ground or drive wheels to revolve independently when turning corners or curves.

The gatherer-drum 16 essentially consists of opposite drumheads 25 in the form of sprocket-gears, receiving thereover the conveyer-chains 7, a plurality of longitudinal body-slats 26, and a plurality of yielding gathering-fingers 27. The slats 26 are bolted or otherwise secured at their ends to supporting-lugs 28 at the inner sides of the drumheads or gears 25, and the gathering-fingers 27 essentially consist of hay-engaging pins projecting beyond the slats 26 and having spring-coiled body portions $27^a$ spirally or helically coiled about the slats 26 and fastened thereto. The fingers 27 are arranged in spaced relation upon the slats 26 and are located between the cables 9, which also pass about the slatted body of the frame.

The gatherer-drum 16 is held elevated above the ground, and associated therewith is a rear lifting-rake $28^a$, consisting of a series of tines arranged approximately concentric to the drum and secured fast to a rocking rake-bar 29. This rocking rake-bar is journaled in suitable bearings 30 on a supporting-frame extension 31 and carries an adjusting-lever 32, provided with a suitable latch device 33, engaging notches in the notched locking-segment 34, arranged on the frame extension 31. Through the medium of the lever 32 the rake may be thrown in and out of action and when lowered serves to rake the hay from the ground and guide the same to a position where it is caught up by the fingers of the gatherer-drum and carried onto the elevating-conveyer and thence to the wagon.

A plurality of shield-bars 35 are preferably arranged longitudinally over the upper run of the conveyer to hold the hay onto the latter in windy weather, and in a corresponding position below the lower run of the conveyer are arranged a plurality of longitudinally-disposed conveyer-guards 36, which serve to prevent sagging down of the said lower run of the conveyer-web.

I claim—

In a hay-loader, a wheeled inclined elevator-frame, a gatherer-drum arranged at the lower end of the frame and consisting of sprocket-heads provided with inwardly-projecting supporting-lugs, a plurality of spaced longitudinal body-slats secured at their ends to said lugs, and a series of spaced gathering-fingers mounted on each of said slats, and each having a helically-coiled spring-body encircling the slat, an upper conveyer-shaft carrying sprockets, an endless elevating-conveyer passing over the slats of the gatherer-drum and also over the upper conveyer-shaft, said conveyer having chains engaging both sets of sprockets, driving mechanism for the gatherer-drum, and an independently-adjustable lifting-rake arranged in rear of the gatherer-drum and projecting below the plane of the latter.

In testimony whereof I hereunto affix my signature in the presence of two witnesses.

HILAS V. CONGROVE.

Witnesses:
Z. E. JACKSON,
MYRTLE CAMPBELL.